(12) United States Patent
Shelton et al.

(10) Patent No.: US 7,506,041 B1
(45) Date of Patent: Mar. 17, 2009

(54) SECURE MANAGEMENT PROTOCOL (75) Inventors: James Shelton, Cooper City, FL (US); Steven Clark, Parkland, FL (US)

(73) Assignee: Avocent Corporation, Huntsville, AL (US)

( * ) Notice: Subject to any disclaimer, the term of this patent is extended or adjusted under 35 U.S.C. 154(b) by 620 days.

(21) Appl. No.: 10/632,098

(22) Filed: Aug. 1, 2003

(51) Int. Cl.
*G06F 15/173* (2006.01)

(52) U.S. Cl. .................. 709/223; 709/229; 709/227; 726/3

(58) Field of Classification Search ......... 703/223–229; 726/3
See application file for complete search history.

(56) References Cited

U.S. PATENT DOCUMENTS

| | | | | |
|---|---|---|---|---|
| 6,134,581 A | * | 10/2000 | Ismael et al. | 709/202 |
| 6,182,142 B1 | * | 1/2001 | Win et al. | 709/229 |
| 6,633,587 B1 | * | 10/2003 | Bennett | 370/469 |
| 6,944,761 B2 | * | 9/2005 | Wood et al. | 713/155 |
| 7,093,008 B2 | * | 8/2006 | Agerholm et al. | 709/223 |

* cited by examiner

*Primary Examiner*—Ario Etienne
*Assistant Examiner*—El Hadji M Sall
(74) *Attorney, Agent, or Firm*—Davidson Berquist Jackson & Gowdey, LLP (57) ABSTRACT

A method and apparatus for securely managing managed appliances such as keyboard/video/mouse (KVM) switches using a network communication protocol is described. A client workstation initiates a management session by establishing a secure sockets layer connection with the appliance over a predefined TCP port number. This secure management protocol is used to manage appliances that support SNMP by tunneling SNMP protocol requests through the presently-described protocol. The protocol includes a login sequence to enhance the security of data transmitted according to the protocol. The workstation can read and set object identifiers in the managed appliance. The workstation can also read and write files to and from the managed appliance. In addition, a single managed appliance can have multiple management sessions open at one time.

16 Claims, 4 Drawing Sheets

SECURE MANAGEMENT PROTOCOL

CROSS REFERENCE TO RELATED APPLICATIONS

This application is related to U.S. patent application Ser. No. 10/632,097, filed Aug. 1, 2003.

BACKGROUND AND SUMMARY OF THE INVENTION

Simple network management protocol (SNMP) is a common method by which network management appliances can query a management agent using a supported management information base (MIB). SNMP exchanges messages via the user datagram protocol (UDP). Early versions of SNMP did not provide secure transmissions. Although later versions of SNMP provided some security, these SNMP versions required that each potential user's security information must be programmed into the appliance. The secure SNMP protocols do not allow for centralized authentication using certificates such as X509 certificates.

The present invention includes a secure management protocol (SMP) for exchanging messages across a network. More specifically, the present invention includes a protocol for securely reporting network device information across a network.

In one embodiment of the present invention, the devices connected are managed appliances. These managed appliances include devices that serve as keyboard/video/mouse (KVM) switches, such as those sold by Avocent Corporation of Huntsville, Ala. Another type of managed appliance is a serial switching device that allows a workstation user to switch among different serially-managed devices. An example of such a device is the CPS1610 product also sold by Avocent Corporation.

KVM switch managed appliances permit a user at a client workstation connected to the network to be able to control a server through the KVM switch. Control of the server originates at the workstation. The control signals pass through the network to the KVM switch. The KVM switch routes the control signals to the particular server that the user is attempting to control. The server can also send data and signals, e.g., video signals, back to the user at the client workstation. The information is transmitted from the server to the KVM switch. The KVM switch then formats the information into a network-compatible format and transmits the information across the network to the client workstation. The client workstation decodes or reformats the received information and responds to it appropriately. In the case of video data received from the KVM switch, the client workstation formats the video data into an appropriate format for display on the video monitor connected to the workstation. Other information that can be transmitted from the server to the workstation includes keyboard information, cursor-control device information, or any other information that can be received and utilized by the workstation.

A KVM switch managed appliance can allow a user at a client workstation to communicate with hundreds, even thousands, of servers through a single managed appliance. In large computer network environments, there may be several KVM switch managed appliances connected to a single network. Moreover, because the client workstation and the managed appliance are frequently connected across an Ethernet-type network, the workstation user and the managed appliance can be located several thousand feet apart. A KVM switch managed appliance can also be connected to the internet, directly or through an Ethernet-type network, permitting a workstation user to be connected to the managed appliance from anywhere in the world. In such a situation, one person may be connecting the managed appliance to the internet and the bank of servers, while another person located hundreds of miles away may be the administrator responsible for actually configuring the managed appliance. In that situation, it is very difficult and time consuming for the network administrator to travel to the location of the managed appliance in order to configure that device for communication through the internet or even through a local area network (LAN).

The present secure management protocol generally consists of a set of requests and replies. A client workstation issues a request to the managed appliance, and the managed appliance returns a reply to the client. In one embodiment of the present invention, the secure management protocol also contains a broadcast message in which a managed appliance sends an unsolicited message to the client.

In order for a client to manage a managed appliance, the client first establishes a management session with the appliance. When a client initiates a management session with an appliance, the client establishes a secure sockets layer (SSL) connection with the appliance over a predefined TCP port number. All management requests between the client and the managed appliance are made over this SSL connection. SSL implements industry standards for encryption using Transport Layer Security version 1 (TLSv1). All data over this SSL connection preferably uses either the 128-byte RC4 encryption algorithm and the anonymous Diffie-Hellman key exchange, or the 128-byte RC4 encryption algorithm with X509 certificates or a PKCS#12 file. The 128-byte RC4 encryption algorithm with X509 certificates or a PKCS#12 file allows for authentication without username and passwords.

The managed appliance listens on the predefined TCP port number for the SSL connection request that will be initiated by the client. Once the managed appliance has accepted an incoming connection request, it passes the session on for further processing, and listens again on the predefined TCP port number in order to accept another connection request.

Once a successful SSL connection has been established, the client workstation will initiate a login request to the managed appliance. This login request will contain the user credentials (i.e., the user name and the password) to be used during this management session. The managed appliance will verify that the user name and password are valid by verifying the user credentials against its database.

Preferably, managed appliances allow multiple management sessions at the same time. The number of multiple sessions that an appliance can support at one time can vary from appliance to appliance. Once an appliance has reached the maximum number of management sessions open at a given time, no other client will be able to manage the appliance using the SMP protocol. In this situation, a client will be able to establish an SSL connection to the managed appliance. However, when a client issues a subsequent login request, the appliance will return an error indicating that the maximum number of sessions has already been established and the connection will be terminated. Also, in a preferred embodiment, if the managed appliance does not receive a login request within 30 seconds of the SSL connection establishment, the appliance will terminate the connection. Also preferably, if the managed appliance returns an INVALID REQUEST error message in response to a login request from the client, the appliance will terminate the connection.

Once the login has been successfully completed, any other SMP request may be issued. The login only insures that a valid user has obtained the SSL connection. The user credentials sent in the login request preferably are stored by the appliance and used by the appliance to authenticate any subsequent messages sent by the client.

A managed appliance should not service any other SMP requests until they have been authenticated or they have been authenticated using a certificate. No reply should be returned by the appliance if any other SMP command is received before the login request.

In a preferred embodiment, a client will send a logout request to end the current user's management session with the managed appliance. The managed appliance will issue a logout reply to the client in response to the logout request and then drop the connection. If the SSL connection is broken, the managed appliance should consider the client logged out.

Also in a preferred embodiment, the secure management protocol is used to manage appliances that support SNMP. This is accomplished by tunneling SNMP protocol requests through the SMP protocol. In other words, the transmission of SNMP commands occurs over the SSL connection using the SSL communication method. Generally, each managed appliance must implement an SNMP agent and an enterprise management information base (MIB). Generally speaking, an MIB is a set of managed objects that defines the data that can be obtained from an appliance. In one aspect of the invention, the SMP protocol provides SNMP commands that allow a client to configure MIB objects in an appliance. In another aspect of the invention, the client, using the SMP protocol, has access to all the MIB objects defined in the enterprise MIB as well as all of the MIB-II objects.

BRIEF DESCRIPTION OF THE DRAWINGS

The invention will be more fully understood from the following detailed description taken in conjunction with the accompanying drawings in which.

DETAILED DESCRIPTION OF THE INVENTION

The present protocol permits the secure communication across a general purpose network for the purpose of managing appliances. A user at a workstation remote from the managed appliance can securely communicate with the managed appliance across the network in order to login and otherwise manage the appliance. The present protocol also allows a workstation user to read and write files to and from the managed appliance.

Figure 1:
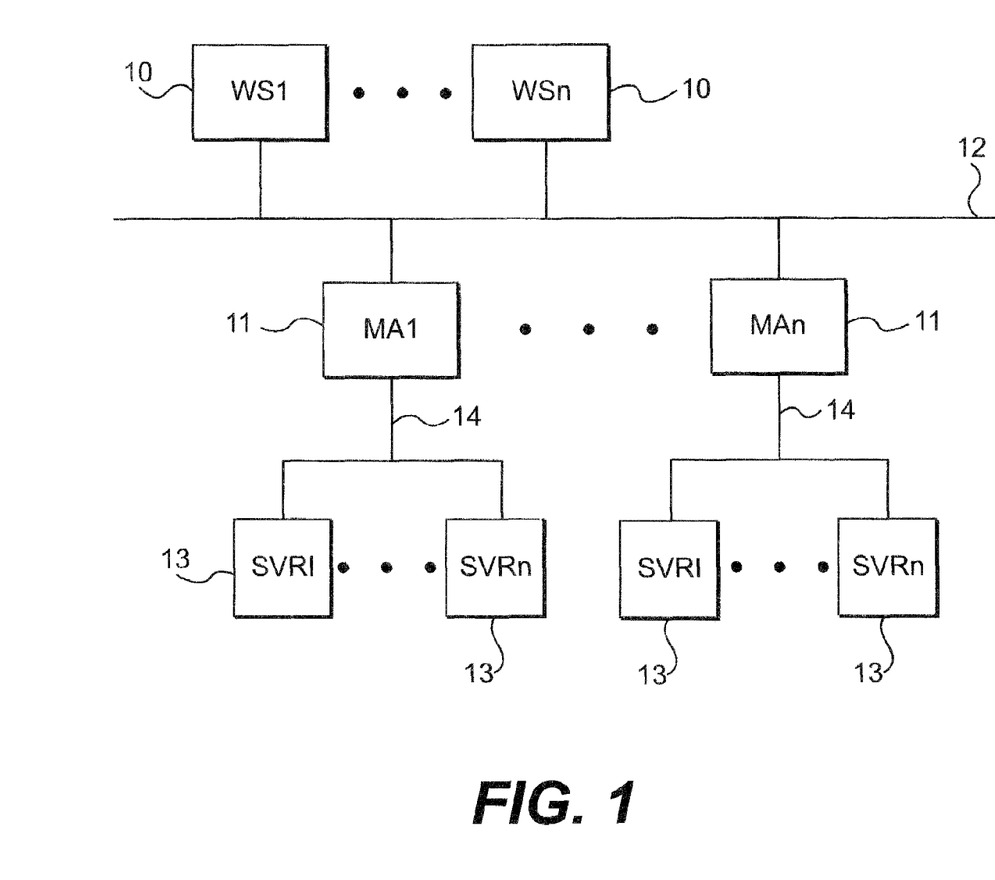
FIG. 1 illustrates a network application including a plurality of workstations and a plurality of managed appliances in which the workstations and managed appliances securely communicate according the presently described secure management protocol.

Referring to FIG. 1, one or more workstations 10 WS1-WSn are connected to a general purpose network 12. The network 12 can be a wired network, a wireless network, or a network having wired and wireless components. Also attached to the general purpose network 12 are one or more managed appliances 11 MA1-MAn. In the situation where each managed appliance is a keyboard/video/mouse (KVM) switch, each managed appliance communicates with one or more servers 13 SVR1-SVRn. Alternatively, instead of managed appliance 11 communicating with servers, managed appliance 11 can communicate with any number of serial devices.

Communication between managed appliance 11 and server bank 13 is conducted over communication link 14. Communication link 14 may be a plurality of dedicated cables, for example category 5 (CAT5) cables. In such a configuration, there is typically one CAT5 cable extending between managed appliance 11 and each server 13. Thus, if there are 10 servers 13 connected to managed appliance 11, there would be 10 CAT5 cables extending between managed appliance 11 and the bank of 10 servers 13. As shown in FIG. 1, there can be a virtually unlimited number of servers 13 connected to a single managed appliance 11 where the managed appliance is a KVM switch managed appliance.

An alternative method of connection between managed appliance 11 and the bank of servers 13 involves the use of a plurality of dedicated cables for each server 13. Thus, in such an arrangement, there can be for example a set of three cables extending between the managed appliance 11 and each server 13. One of the three cables extending is for the video signals communicated to and from server 13. A second cable is for the mouse (i.e., the cursor control device) signals which are communicated to and from server 13. And finally, the third cable is for communication of keyboard signals to and from server 13.

Another alternative connection configuration between managed appliance 11 and server bank 13 involves the use of so-called daisy chain connections. In such an arrangement, a single cable, for example a CAT 5 cable, is connected between managed appliance 11 and a first server 13. The connection 14 is then daisy chained from the first server 13, for example SVR1, to a second server 13, for example SVR2. Server SVR2 is then connected to server SVR3, and server SVR3 is then connected to server SVR4, etc. In such an arrangement, managed appliance 11 can communicate with any one of the servers SVR1 through SVRn over the daisy-chained communication link 14.

A further alternative connection configuration between managed appliance 11 and server bank 13 involves the use of a combination of any of the foregoing connection configurations for communication link 14. Thus, for example, some servers 13 could be connected to managed appliance 11 via a CAT5 cable. Other servers could be connected via a plurality of dedicated cables. Yet other servers could be connected via a daisy-chain connection.

Also as shown in FIG. 1, there can be a virtually unlimited number of managed appliances 11 connected to general purpose network 12. Indeed, general purpose network 12 can be the internet, or a local area network, or a combination of a local area network and the internet, or any other general purpose network, or combination of networks, utilizing a standard or proprietary communication protocol.

As FIG. 1 shows, each managed appliance connected to network 12 can be a KVM switch managed appliance. Each such managed appliance 11 can be connected to its own server bank 13 in any of the alternative ways described above. For example, managed appliance 1 can communicate with its servers 13 using a daisy-chained connection configuration. While, on the other hand managed appliance 2 can communicate with its server bank 13 utilizing for each server a plurality of dedicated keyboard, video monitor, mouse cables. Managed appliance 3 can communicate with each server 13 via a single CAT 5 cable. In other words, the type of connection between each managed appliance and its associated servers can be any one of the different types of communication configurations described above or any other alternative communication connection configuration. Moreover, these connection configurations can vary from managed appliance to managed appliance without regard to what type of connection is used with any of the other managed appliances.

As shown in FIG. 1, there can be any number of workstations 10 connected to network 12. As contemplated in the present application, any of the workstations 10 can communicate with any of the managed appliances 11 using the secure management protocol described herein.

Figure 2:
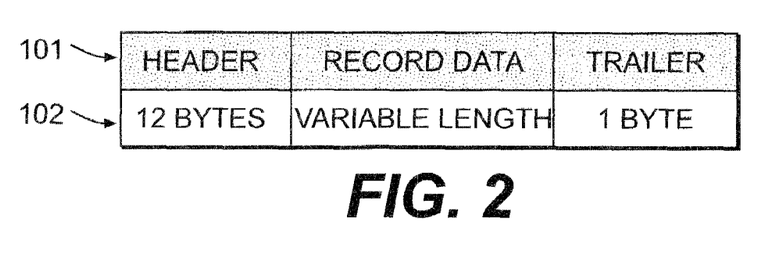
FIG. 2 shows an exemplary packet for communication using a secure management protocol according to the present invention.

FIG. 2 shows the packet format for a preferred embodiment of the present secure management protocol. Description line 101 shows the three distinct parts of the secure management protocol message format. Line 102 shows the length of each of the three parts of the message format. In the presently preferred embodiment, the header is made up of twelve bytes. The record data portion of the message format is a variable length which will be further described below. Finally, the trailer portion of the secure management protocol message format is preferably one byte.

The preferred embodiments of the header, trailer, and record data fields of the secure management protocol messages will now be described. The SMP header consists of the following fields. The start of heading (SOH) field is the start flag marking the beginning of the message. The SOH field is preferably one byte long. The signature field is the unique signature ID indicating that this is a secure management protocol message. This field is preferably four bytes long. Preferably, this value will be the ASCII representation of a label identifying the SMP protocol such as "SMP." The sequence number field is the unique packet sequence number used for ordering packets. This field is preferably two bytes long. The value of the sequence number field increments by one for each packet sent. Preferably, this value is sent in network byte order and the range is from 1-65,535. The command ID field contains the unique code for the SMP command contained in the message. This field is preferably one byte in length. Finally, the record length field is the total number of bytes in the record data field that follows. The length of the record length field is preferably four bytes long. The record length value is sent in network byte order and ranges from 0-4,294,967,295.

The command ID subfield contains the unique code for the SMP command contained in the message. In the preferred embodiment, the commands include LOGIN, LOGOUT, SNMPGET, SNMPGETNEXT, SNMPSET, OPEN FILE FOR WRITE, WRITE FILE, CLOSE FILE AFTER WRITE, OPEN FILE FOR READ, READ FILE, CLOSE FILE AFTER READ, and BROADCAST.

The trailer portion of the SMP message protocol is preferably one byte in length and preferably contains the hexadecimal representation of a carriage return to mark the end of an SMP message.

The record data portion of the SMP message is a variable length field containing the data to be sent using the protocol. The data is encoded based upon the SMP command ID.

Figure 3:
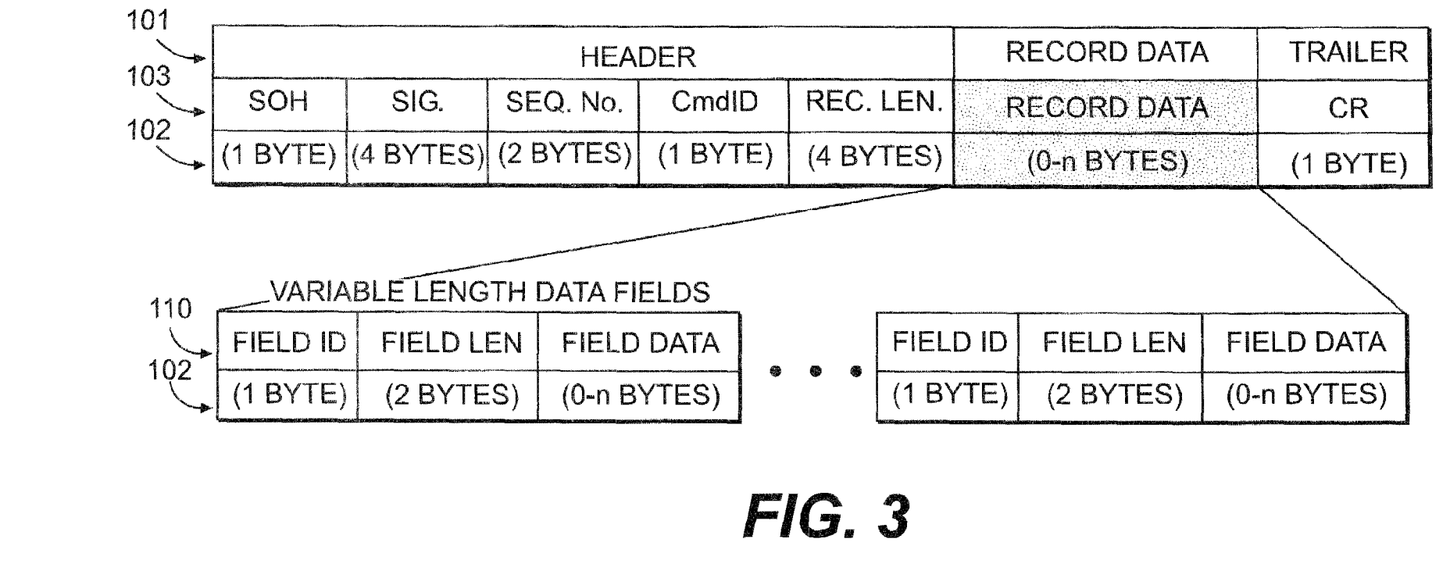
FIG. 3 shows another exemplary embodiment of a communication data packet according to the present invention.

Referring to FIG. 3, certain SMP commands may contain variable length data fields encoded within the record data portion of the SMP message. There can be more than one variable length data field in the record data portion. These variable length data fields will use an extensible record format having three fields, namely: field ID, field length, and field data. The field ID field is one byte in length; the field length field is two bytes in length; and the field data field is 0-n bytes in length. The field ID field contains a unique field ID for this field within the record data. The field length field is the total number of bytes in the field data that follows. This value is preferably sent in network byte order and ranges from 0-65,535. The field data field contains the data for the field.

FIG. 3 shows the SMP message having a plurality of variable length data fields contained within the record data portion of the SMP message. An SMP message can have any number of variable length data fields from 1-n. The variable length data fields contained in the record data portion of the message may appear in any order. Again, row 101 of FIG. 3 labels the portions of the SMP message. Row 103 identifies the fields contained within each of the three portions of the SMP message. Row 102 identifies the length of each of the fields contained within the SMP message. Row 110 contains the field names for the fields in a variable length data field.

As shown in FIG. 3, one or more variable length data fields are contained within the record data portion of an SMP message. The variable length data fields contained in the record data portion of the message may appear in any order.

Figure 4:
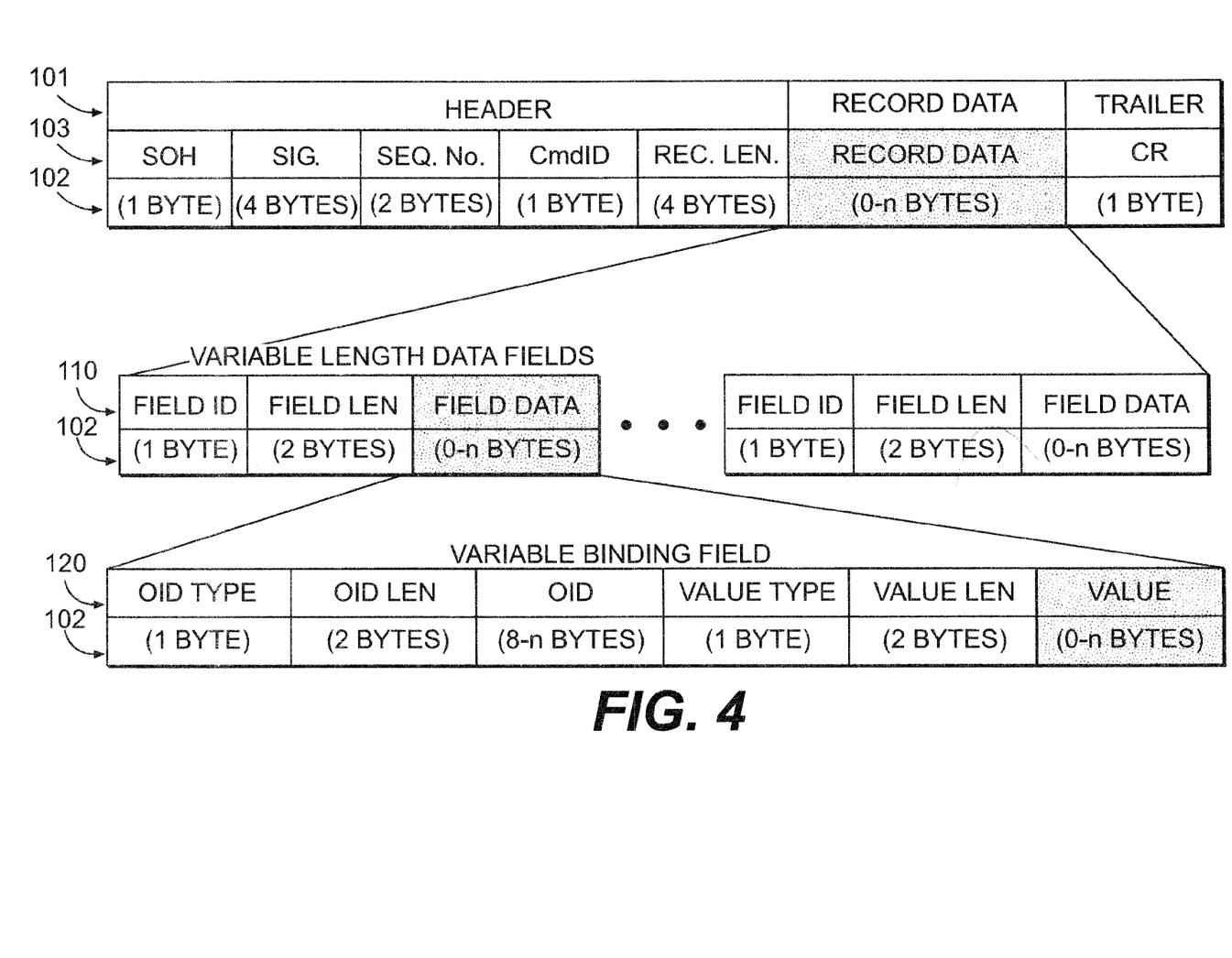
FIG. 4 shows a further exemplary communication data packet according to the present invention.

In a preferred embodiment, for some of the SMP commands, for example, the SNMP commands, the variable length data fields of the record data may contain a variable binding field. These variable binding fields contain further encoding. FIG. 4 shows how the variable binding field appears within the field data sections of an SMP message. Row 120 identifies the name of each of the sub-fields for a given variable binding field. The sub-fields include OID type, OID length, OID value, value type, value length, and value. Preferably, the OID type sub-field is one byte in length, the OID length sub-field is two bytes in length; the OID value sub-field is 8-n bytes in length; the value type sub-field is one byte in length; the value length sub-field is two bytes in length; and the value sub-field is 0-n bytes in length.

The OID type sub-field has a predefined value indicating that the variable binding field is an object identifier. The OID length sub-field contains the number of bytes in the OID that follows. Preferably, this value is sent in network byte order. The OID value sub-field contains the OID as an array of integers, each integer being four bytes long. Preferably, the minimum length is eight bytes because the smallest OID that can be used in the command is two integers (example: 0.0). Thus, the upper limit "n" has to be a multiple of four. The value type sub-field contains the type of the variable binding value. In the preferred embodiment, the variable binding value can be one of the following standard SNMP types: ASN_INTEGER, ASN_BITS, ASN_OCTET_STRING, ASN_NULL, ASN_OBJECT IDENTIFIER, ASN_SEQUENCE, ASN_SEQUENCEOF, ASN_IP_ADDRESS, ASN_COUNTER32, ASN_GUAGE32, ASN_TIMETICKS, ASN_OPAQUE, ASN_COUNTER64, and ASN_UNSIGNED32.

Objects in the MIB are defined using Abstract Syntax Notation One (ASN.1) defined in ITU-T recommendation X.208 (ASN.1). This specification also specifies basic data types and how they are transmitted. So for each object contained in the MIB it has an associated type. INTEGER: a data type taking a cardinal number as its value. BIT STRING: a data type taking zero or more named bits as its value. OCTET STRING: a data type taking zero or more octets as its value. Each byte in an octet string may take any value from 0 to 255. OBJECT IDENTIFIER: data type specifying an OID. SEQUENCE: a data type denoting an ordered list of zero or more elements which are other ASN.1 types. UNSIGNED: a data type taking a unsigned number. COUNTER32: a data type representing a non-negative integer, which monotonically increases until it reaches a maximum value, when it wraps back to zero. GAUGE32: a data type representing a non-negative integer, which may increase or decrease, but which may never exceed the maximum value. TIMETICKS: a data type representing a non-negative integer, which counts the time in hundredths of a second since some epoch. OPAQUE: a data type representing an arbitrary encoding. IP_ADDRESS: A data type representing an IP address. COUNTER64: a data type used only when Counter32 would wrap in less than an hour.

The value length sub-field contains the length of the variable binding value that follows. Preferably, this value is sent in network byte order. The value sub-field contains the variable binding value.

In the preferred embodiment, the value section of the variable binding field is encoded differently based upon the value type. For example, the ASN_INTEGER value type has one byte for the value type, two bytes for the value length, and four bytes for the value. The ASN_COUNTER32, ASN_GUAGE32, and ASN_TIMETICKS value types have one byte for the value type, two bytes for the value length, and four bytes for the value. The ASN_COUNTER64 value type has one byte for the value type, two bytes for the value length, and eight bytes for the value. The ASN_OCTET_STRING, and ASN_RFC1213_DISPLAY_STRING (defined in the Internet Engineering Task Force's (IETF's) RFC1213) value types have one byte for the value type, two bytes for the value length, and 1-n bytes for the value. ASN_OBJECT IDENTIFIER has one byte for the value type, two bytes for the value length, and 1-n integer OID values which are each four bytes corresponding to the value of the data in the variable binding field. ASN_NULL has one byte for the value type, two bytes for the value length, and no bytes corresponding to the value.

The commands of the preferred embodiment will now be described. Each command type has a request message and a reply message associated with it. For example, the Login command has a Login Request message and a Login Reply message.

The Login Request message is sent from a client to a managed appliance to log a specific user into the appliance to allow subsequent management of the appliance. Preferably, the Login Request message should be the first command sent to the managed appliance after an SSL connection has been established. A managed appliance should not reply to any other command until a user has been successfully logged in.

In a preferred embodiment, the record data portion of the Login Request message includes the following variable length data fields: a user name field, and a password field. The user name field has a field ID, a field length, and a field data section that are 1 byte, 2 bytes and 0-n bytes long. Field ID is a predefined value identifying the variable length data field as a user name field. The field length field identifies the total number of bytes in the user name that follows. This value is preferably sent a network byte order. The field data subfield is a sequence of byte values containing characters representing the user name. This subfield is not null terminated. This field uses the UTF-8 character encoding format described further in the UTF-8 RFC 2279 specification published by the IETF.

The password field has a field ID, a field length, and a field data section that are 1 byte, 2 bytes, and 0-n bytes long, respectively. Again, the field ID contains a unique value identifying the variable length data field as a password field. The field's length is the total number of bytes in the password that follows. This value is preferably sent in network byte order. The field data subfield is a sequence of byte values containing characters representing the password. This subfield is not null terminated. This field uses the UTF-8 character encoding format.

In the preferred embodiment, the user name field and the password field must appear in a login request message. The user name field and the password field may appear in any order.

Upon receipt of the Login Request message, the managed appliance will verify the user name and password against its user database. The managed appliance will generate a Login Reply message to the client to indicate the status of the request. The client will wait 30 seconds for a Login Reply message from the managed appliance. If the reply message is not received within 30 seconds after issuing the Login Request message, the client will drop the connection to the managed appliance. Once a client has successfully logged in, these "user credentials" will be used by the managed appliance to control access to subsequent commands.

The Login Reply message is sent from the managed appliance to the client in response to a Login Request message. A Login Reply message contains the status of the Login Request. The record data portion of the reply message contains a variable length data field referred to in the preferred embodiment as the status field. The status field has a field ID) subfield, a field length subfield, and a field data subfield that are 1 byte, 2 bytes, and 2 bytes long, respectively. The field ID subfield identifies the variable length data field as the status field. The field length subfield is the length of the status data field that follows. The field data subfield is the value indicating the status of the request. Preferably, this value is sent in network byte order.

The possible status codes that are contained in the status field are NOERROR, UNKNOWN_USER_PASSWORD, INVALID_REQUEST, APPLIANCE_ERROR, and MAX_SESSIONS_ACTIVE. The NOERROR status code indicates a successful login in which no error occurred. The UNKNOWN_USER_PASSWORD code indicates an invalid user name or password. The INVALID_REQUEST status code indicates an invalid request was sent to the appliance. The APPLIANCE_ERROR status code indicates that the appliance was unable to process the request due to an internal error (for example, out of memory, not enough resources, etc.). The MAX_SESSIONS_ACTIVE indicates that the maximum number of SMP sessions is currently active.

For the Logout command, the Logout Request message is sent from a client to a managed appliance. This command logs out the currently logged in user from the managed appliance. The record data portion of the Logout Request message contains no data other than a field terminator. This predefined field terminator terminates the record data portion of any given message. Upon receipt of the Logout Request message, the managed appliance will automatically logout the current user. The managed appliance will generate a Logout Reply message to the client to indicate the status of the logout request message. After issuing the Logout Reply message, the managed appliance will terminate the connection.

The Logout Reply message is sent from the managed appliance to the client in response to a Logout Request message. This Logout Reply message contains the status of the Logout Request. After issuing the Logout Reply message, the managed appliance will terminate the connection. The record data portion of the Logout Reply message contains a variable length data field entitled status field. The status field contains a field ID subfield, a field length subfield, and a field data subfield that are 1 byte, 2 bytes, and 2 bytes long, respectively. The field ID subfield is the predefined status field ID identifying the variable length data field as the status field. The field length subfield is the length of the status data field that follows. Preferably, this value is sent in network byte order. The field data subfield is the value indicating the status of the request. This value is also sent preferably a network byte order.

The potential status codes that can be contained within the status field are NOERROR, NO_USER_LOGGED_IN, INVALID_REQUEST, and APPLIANCE_ERROR. A NOERROR status code indicates a successful logout in which no error occurred. The NO_USER_LOGGED_IN status code indicates that no user is currently logged in to the managed appliance. An INVALID_REQUEST status code indicates that an invalid request was sent to the appliance. An APPLIANCE_ERROR status code indicates that the appliance was unable to process the request due to an internal error (for example, out of memory, not enough resources, etc.).

For the SNMP Get command, the SNMP Get Request message is sent from a client to a managed appliance to retrieve the value for one or more OIDs from the managed appliance. The record data portion of the SNMP Get Request message contains a variable length data field that is a variable binding field. The variable binding field contains the OID that the client wants to get the value for from the managed appliance. Like all other variable length data fields, the variable binding field contains a field ID subfield, a field length subfield, and a field data subfield. The field ID subfield is 1 byte long, and contains a predefined value identifying the variable length data field as a variable binding field. The field length subfield is 2 bytes long and indicates the total number of bytes in the variable binding field that follows. This value is preferably sent in network byte order.

The field data subfield contains two further subfields which are the VALUE OF OID subfield and the OID TO GET subfield. The OID TO GET subfield further includes an OID type subfield, an OID length subfield, and an OID subfield. The OID type subfield is 1 byte long and indicates that this is an OID. The OID length subfield is 2 bytes long and indicates the length of the OID to be obtained. The OID subfield is 8-n bytes long and indicates the OID whose value is being requested by the client.

The VALUE OF OID subfield further includes a value type subfield (1 byte), a value length subfield (2 bytes), and a value subfield (0 bytes). The value type subfield is a predefined value which indicates the type of the value requested in an SNMP Get Request message and should be equal to the code for the ASN_NULL value type. The value length subfield is the length of the value subfield and should be 0 for an SNMP Get Request message. The value subfield is the value for the OID. But there should not be a value associated with this field in the case of an SNMP Get Request message. As will be appreciated, there may be multiple variable binding fields in an SNMP Get Request message.

Upon receipt of the SNMP Get Request message, the managed appliance will get values for the OIDs specified in the variable binding fields. It will then generate an SNMP Get Reply message to the client. The SNMP Get Reply message will contain the status of the SNMP Get Request message and the values for the OIDs if the request was successful.

The record data portion of the SNMP Get Reply message contains three variable length data fields. The first variable length data field is the SNMP Error Status field. The second variable length data field is the SNMP Get Response Error Index field. The third variable length data field is the Variable Binding field. Multiple Variable Binding fields are allowed.

The SNMP Error Status field has a field ID subfield (1 byte), a field length subfield (2 bytes), and a field data subfield (2 bytes). The field ID subfield contains a predefined value indicating that this is an SNMP Error Status field. The field length subfield is the length of the SNMP Error Status that follows. This value is preferably sent in network byte order. The field data subfield is the SNMP Error Status. Preferably, the SNMP Error Status codes include NOERROR, TOOBIG, NOSUCHNAME, BADVALUE, READONLY, GENERR, INVALID_REQUEST, and APPLIANCE_ERROR.

The NOERROR, TOOBIG, NOSUCHNAME, BADVALUE, READONLY and GENERR codes are standard SNMP error codes defined in RFC1157. The appliance returns these when the SNMP request fails for one of the standard SNMP reasons. The NOERROR status code indicates that there was no error. TOOBIG indicates that the response to this SNMP request would be too large to send. NOSUCHNAME indicates that the SNMP object requested is not available. BADVALUE indicates that the value retuned for the object is not a valid value for the type of the object as defined in the MIB. READONLY indicates that the client tried to set the value of an object that is marked as READONLY in the MIB. GENERR is a catch-all error returned when none of the other SNMP errors is appropriate. INVALID_ REQUEST is generated by the appliance when it receives a request from the client that is not properly formatted (invalid length, types, etc). APPLIANCE_ERROR is generated by the appliance when it cannot complete the request due to an error in the appliance such as out of memory, not enough resources, etc.

The SNMP Get Response Error Index field includes a field ID subfield (1 byte), a field length subfield (2 bytes), and a field data subfield (2 bytes). The field subfield contains a predefined value indicating that this is an SNMP Get Response Error Index field. The field length subfield indicates the length of the SNMP Get Response Error Index that follows. The field data subfield indicates the SNMP Get Response Error Index. This value is preferably sent in network byte order. Preferably, this value is 0 if the value for the SNMP Error Status Field is NOERROR, INVALID_ REQUEST, or APPLIANCE_ERROR. If an SNMP error occurs, the SNMP Get Response Error Index variable indicates which variable binding gave rise to the error.

The variable binding field in an SNMP Get Reply message contains the OID that was contained in the corresponding SNMP Get Request message, as well as the value for the OID. The variable binding field contains a field ID (1 byte), a field length subfield (2 bytes), and a field data subfield that is a variable length. The field ID subfield is a predefined value indicating that this is a variable binding field. The field length subfield indicates the total number of bytes in the variable binding field that follows. The field data subfield includes two further subfields which are the VALUE OF OID subfield and the OID RETRIEVED subfield.

The OID RETRIEVED subfield includes an OID type subfield (1 byte), an OID length subfield (2 bytes), and an OID subfield (8-n bytes). The OID type subfield is a predefined value indicating that this is an OID. The OID length subfield is the length of the OID RETRIEVED. The OID subfield indicates the OID whose value was retrieved by the client.

The VALUE OF OID subfield further includes a value type subfield (1 byte), a value length subfield (2 bytes), and a value subfield (0-n bytes). The value type subfield indicates the value type for the OID requested. The value length subfield is the length of the value retrieved. The value subfield is the value for the OID requested. There may be multiple variable binding fields in a single SNMP Get Reply message. There should be one variable binding field for every variable binding field contained in an SNMP Get Request message. The SNMP Error Status Field, the SNMP Get Response Index Field, and the variable binding field(s) may appear in any order.

For the SNMP Get Next command, the SNMP Get Next Request message is sent from a client to a managed appliance to retrieve the value for the OID following the OID that is specified in a variable binding field from the managed appliance. The record data portion of the SNMP Get Next Request message contains one or more variable length data fields which are variable binding fields. The variable binding fields contain the OID preceding the OID whose value is requested by the client. The variable binding field of an SNMP Get Next Request message is the same content and has the same values as the variable binding fields for an SNMP Get Request message. That is, the variable binding field contains a field ID subfield (1 byte), a field length subfield (2 bytes), and a field data subfield (variable length). A field ID subfield is a predefined value indicating that this is a variable binding field. The field length subfield is the total number of bytes in the variable binding field that follows.

The field data subfield contains two further subfields which are the VALUE OF OID subfield and the OID TO GET NEXT subfield. The OID TO GET NEXT subfield contains an OID type subfield (1 byte), an OID length subfield (2 bytes), and an OID subfield (8-n bytes). The OID type subfield is a predefined value indicating that this is an OID. The OID length subfield is the length of the OID preceding the OID whose value is sought. The OID subfield is the OID preceding the OID whose value is sought.

The VALUE OF OID subfield further includes a value type subfield (1 byte), a value length subfield (2 bytes), and a value subfield (0 bytes). The value type subfield is a predefined value indicating the type of the value which should always be ASN_NULL. The value length subfield is the length of the value. This length should be set to 0 for an SNMP Get Next Request message. The value subfield is the value for the OID. In an SNMP Get Next Request message, there should never be a value for this field.

For the SNMP Get Next Reply message, the managed appliance will obtain the values for the OIDs following the OIDs specified in the variable binding values upon receipt of an SNMP Get Next Request message. The managed appliance will then generate an SNMP Get Next Reply message to the client. The message will contain the status of their request, and the values for the OIDs following the OIDs specified in the request message, if the request was successful.

A record data portion of the SNMP Get Next Reply message contains at least three different variable length data fields which include an SNMP Error Status Field, an SNMP Get Response Error Index Field, and one or more variable binding fields.

The SNMP Error Status Field includes a field ID subfield (1 byte), a field length subfield (2 bytes), and a field data subfield (2 bytes). The field 1 subfield includes a predefined value indicating that this is an SNMP Error Status Field. The field length subfield is the length of the SNMP Error Status that follows. This value is preferably sent in network byte order. The field data subfield is the SNMP Error Status data.

The SNMP Error Status codes include NOERROR, TOOBIG, NOSUCHNAME, BADVALUE, READONLY, GENERR, INVALID_REQUEST, and APPLIANCE_ERROR. As described earlier, the NOERROR, TOOBIG, NOSUCHNAME, BADVALUE, READONLY and GENERR codes are standard SNMP error codes defined in RFC1157. The appliance returns these when the SNMP request fails for one of the standard SNMP reasons. The NOERROR status code indicates that there was no error. TOOBIG indicates that the response to this SNMP request would be too large to send. NOSUCHNAME indicates that the SNMP object requested is not available. BADVALUE indicates that the value retuned for the object is not a valid value for the type of the object as defined in the MIB. READONLY indicates that the client tried to set the value of an object that is marked as READ-ONLY in the MIB. GENERR is a catch-all error returned when none of the other SNMP errors is appropriate. INVALID_REQUEST is generated by the appliance when it receives a request from the client that is not properly formatted (invalid length, types, etc). APPLIANCE_ERROR is generated by the appliance when it cannot complete the request due to an error in the appliance such as out of memory, not enough resources, etc.

The SNMP Get Response Error Index Field includes a field ID subfield (1 byte), a field length subfield (2 bytes), and a field data subfield (2 bytes). The field ID subfield includes a predefined value which indicates that this is an SNMP Get Response Error Index Field. The field length subfield indicates the length of the SNMP Get Response Error Index that follows. This value is preferably sent in network byte order. The field data subfield indicates or includes the SNMP Get Response Error Index. This value is also preferably sent in network byte order. This value should be 0 if the value for the SNMP Error Status Field is NOERROR, INVALID_REQUEST, or APPLIANCE_ERROR. If an SNMP error occurs, the SNMP Get Response Error Index variable indicates which variable binding gave rise to the error.

A variable binding field in an SNMP Get Next Reply message contains the OID following the OID that was contained in the corresponding SNMP Get Next Request message, as well as the value for that OID.

The variable binding field contains a field ID subfield (1 byte), a field length subfield (2 bytes), and a field data subfield (variable length). The field ID subfield includes a predefined value indicating that this is a variable binding field. The field length subfield indicates the total number of bytes in the variable binding field that follows. This value is preferably sent in network byte order. The field data subfield is comprised of two further subfields which are the VALUE OF NEXT OID subfield and the OID OF NEXT subfield.

The OID OF NEXT subfield is further comprised of additional subfields which are the OID TYPE subfield (1 byte), the OID LENGTH subfield (2 bytes) and the OID subfield (8-n bytes). The OID TYPE subfield includes a predefined value indicating that this is an OID. The OID length subfield indicates the length of the OID following the OID specified in the SNMP Get Next Request message. The OID subfield contains the object identifier following the object identifier contained in the SNMP Get Next Request message.

The VALUE OF NEXT OID subfield is further comprised of a value type subfield (1 byte), a value length subfield (2 bytes), and a value subfield (0-n bytes). The value type subfield is the value type for the OID following the OID included in the SNMP Get Next Request message. The value length subfield is the length of the value. The value subfield is the value for the OID following the OID which was included in the SNMP Get Next Request message. There may be multiple variable binding fields in a given SNMP Get Next Reply message. There should be one variable binding field for every variable binding that was requested in the SNMP Get Next Request message. The SNMP Error Status Field, the SNMP Get Response Error Index Field and the variable binding field(s) may appear in any order within a single SNMP Get Next Reply message.

For the SNMP Set command, the SNMP Set Request message is sent from a client to a managed appliance to set the value for an OID in the managed appliance. The record data portion of the SNMP Set Request message contains one or more variable length data fields which are variable binding fields.

The variable binding field includes a field ID subfield (1 byte), a field length subfield (2 bytes), and a field data subfield (variable length). The field ID subfield contains a predefined value indicating that this is a variable binding field. The field length subfield indicates the total number of bytes in the variable binding field that follows. The field data subfield further includes two additional subfields which are the OID VALUE subfield and the OID TO SET subfield.

The OID TO SET subfield includes three further subfields which are the OID type subfield (1 byte), the OID length subfield (2 bytes), and the OID subfield (8-n bytes). The OID type subfield is a predefined value indicating that this is an object identifier. The OID length subfield is the length of the OID to be set. The OID subfield is the OID whose value is to be set by the SNMP set command.

The OID VALUE subfield further includes three additional subfields which are the value type subfield (1 byte), the value length subfield (2 bytes), and the value subfield (O-n bytes). The value type subfield indicates the type of the value. The value length subfield indicates the length of the value. The value subfield is the value to be set for the OID specified in the OID TO SET subfield.

Upon receipt of an SNMP Set Request message, the managed appliance will set the values for the OIDs specified in the variable binding values. The managed appliance will then generate an SNMP Set Reply message to the client. This message will contain the status of the request and the values for the OIDs, if the request was successful.

The record data portion of an SNMP Set Reply message contains at least three variable length data fields which include an SNMP Error Status Field, an SNMP Set Error Index Field, and a variable binding field.

The SNMP Error Status Field includes a field ID subfield (1 byte), a field length subfield (2 bytes), and a field data subfield (2 bytes). The field ID subfield is a predefined value indicating that this is an SNMP Error Status Field. The field length subfield is the length of the SNMP Error Status that follows. This value is preferably sent in network byte order. The field data subfield is the SNMP Error Status code.

The SNMP Error Status codes includes NOERROR, TOOBIG, NOSUCHNAME, BADVALUE, READONLY, GENERR, INVALID_REQUEST, and APPLIANCE_ERROR.

The SNMP Set Error Index Field includes a field ID subfield (1 byte), a field length subfield (2 bytes), and a field data subfield (2 bytes). The field ID subfield is a predefined value indicating that this is an SNMP Set Error Index Field. The field length subfield is the length of the SNMP Set Error Index that follows. The field data subfield is the SNMP Get Set Index. This value is preferably sent in network byte order. This value should be 0 if the value for the SNMP Error Status Field is NOERROR, INVALID_REQUEST, or APPLIANCE_ ERROR. If an SNMP error occurs, the SNMP Get Response Error Index variable indicates which variable binding gave rise to the error.

The variable binding field in an SNMP Set Reply message contains the object identifier that was contained in the corresponding SNMP Set Request message, as well as the value that was set for the object identifier. The variable binding field contains a field ID subfield (1 byte), a field length subfield (2 bytes), and a field data subfield (variable length). The field ID subfield includes a predefined value indicating that this is a variable binding field. The field length subfield indicates the total number of bytes in the variable binding field that follows. This value is preferably sent in network byte order. The field data subfield includes two further subfields which are the OID SET subfield and the OID VALUE subfield.

The OID SET subfield includes three additional subfields which are the OID type subfield (1 byte), the OID length subfield (2 bytes), and the OID subfield (8-n bytes). The OID type subfield is a predefined value indicating that this is an object identifier. The OID length subfield indicates the length of the OID to be set. The OID subfield is the object identifier whose value was set by the SNMP Set Command.

The OID VALUE subfield includes three additional subfields which are the value type subfield (1 byte), the value length subfield (2 bytes), and the value subfield (0-n bytes). The value type subfield is the value type for the object identifier set. The value length subfield is the length of the value set. The value subfield is the value set for the OID included in the SNMP Set Request message. There may be multiple, variable binding fields in a single SNMP Set Reply message. There should be one variable binding field for every variable binding that was requested in the SNMP Set Request message. The SNMP Error Status Field, the SNMP Set Error Index Field, and the variable binding field(s) may appear in any order in a given SNMP Set Reply message.

For the Open File For Write command, the Open File For Write Request message is sent from the client to a managed appliance to inform the managed appliance that the client is going to open a file (on the client work station) and write the file to the appliance. This request message should contain the file name that is to be written to the appliance. This message should be sent to the appliance before writing the contents of the file to the appliance. If the appliance replies to the Open File For Write Request message with an error, the client should not write the file.

The record data portion of an Open File For Write Request message may contain three different types of variable length data fields. Those different variable length data fields include a File Name field, a File Size field, and a File Type field.

The File Name field includes a field ID subfield (1 byte), a field length subfield (2 bytes), and a field data subfield (1-12 bytes). The field ID subfield is a predefined value indicating that this is a File Name field. The field length subfield indicates the length of the File Name value that follows. This value is preferably sent in network byte order. The range for the field length is from 1-12. The field data subfield is a sequence of byte values containing ASCII characters representing the file name. Preferably, the file name is in DOS 8.3 format (for example, CONFIG.EDB).

The File Size field has a field ID subfield (1 byte), a field length subfield (2 bytes), and a field data subfield (4 bytes). The field ID subfield is a predefined value indicating that this is a File Size field. The field length subfield is the length of the File Size value that follows. This value is preferably sent in network byte order. The field data subfield is the total length of the file to be written (i.e., the file size). This value is also preferably sent in network byte order.

The File Type field includes a field ID subfield (1 byte), a field length subfield (2 bytes), and a field data subfield (2 bytes). The field ID subfield is a predefined value indicating that this is a File Type field. The field length subfield is the length of the File Type value that follows. This value is sent in network byte order, preferably. The value of the field length should be 2 in the preferred embodiment since the length of the field data subfield is 2 bytes. The field data subfield indicates the file type. This value is preferably sent in network byte order.

In the preferred embodiment, there are two different file types. A permanent file is a file that should remain in existence even after a reboot of the appliance. A temporary file is a file that will not exist after the next reboot of the appliance. In one embodiment of the invention, the file type field is an optional field. If a file type field is not sent in the Open File For Write Request message, the appliance will assume that the field type is a temporary file.

The File Name field, the File Size field, and the File Type field may appear in any order in an open file for write request message.

Upon receipt of an Open File For Write Request message, the managed appliance will generate an Open File For Write Reply message to the client to indicate the status of the request.

The record data portion of an Open File For Write Reply message contains a variable length data field which is a status field. The status field has a field ID subfield (1 byte), a field length subfield (2 bytes), and a field data subfield (2 bytes). The field ID subfield is a predefined value indicating that this is a status field. The field length subfield is the length of the status data field that follows. Because the field data subfield is 2 bytes long, the value of the field length subfield should be 2. The field data subfield is a value indicating the status of the request.

The status code for the field data portion of the status field include NOERROR, FILE_ALREADY_OPEN_FOR_WRITE, INVALID_REQUEST, and APPLIANCE_ERROR. The NOERROR status code indicates successful opening of the file. In other words, no error occurred. The FILE_ALREADY_OPEN_FOR_WRITE status code indicates that the file specified is already open for write operation. The INVALID_REQUEST status code indicates that an invalid request was sent to the appliance. The APPLIANCE_ERROR status code indicates that the appliance was unable to process the request to an internal error (for example, out of memory, not enough resources, etc.).

For the Write File command, a Write File Request message is sent from a client to a managed appliance to write a file to the appliance. The client will send a block of data to the managed appliance, one block at a time, starting with block one. The client will continue to send blocks of data, sequentially, until there is no more data in the file to send. When there are no more blocks of data to send, a client will issue a Close File After Write command to the appliance to indicate that there is no more data in the file to send and to close the file. A Write File Request message should not be sent to a managed appliance until after the client has sent an Open File For Write command to that appliance.

The record data portion of a Write File Request message contains two different types of variable length data fields which are a block number field, and a block data field.

The block number field contains a field ID subfield (1 byte), a field length subfield (2 bytes), and a field data subfield (2 bytes). The field ID subfield is a predefined value indicating that this is a block number field. A field length subfield indicates the length of the block number value that follows. This value is preferably sent in network byte order. The field data subfield is a unique block number for tracking blocks of data. This value increments for each block of data that is sent. This value is preferably sent in network byte order.

The block of data field includes a field ID subfield (1 byte), a field length subfield (2 bytes), and a field data subfield (1-65,535 bytes). The field ID subfield contains a predefined value indicating that this is a block of data field. The field length subfield is the total number of bytes in the block of data field that follows. This value is preferably sent in network byte order and ranges from 1-65,535. The field data subfield is a block of data from the file to send. The block number field and the block of data field may appear in any order in a Write File Request message.

Upon receipt of a Write File Request message, the managed appliance will generate a Write File Reply message to the client to indicate the status of the request. If an error is returned from the appliance, the appliance will close the file and the client will not issue any additional write file requests.

The record data portion of a Write File Reply message may contain two different types of variable length data fields which are a status field field, and a block number field.

The status field contains a field ID subfield (1 byte), a field length subfield (2 bytes), and a field data subfield (2 bytes). The field ID subfield contains a predefined value indicating that this is a status field. The field length subfield indicates the length of the status data field that follows. Because the field data subfield is 2 bytes long, a field length subfield should indicate a value of 2. The field data subfield is the value indicating the status of the request.

The potential status codes included in the field data subfield include NOERROR, FILE_NOT_OPEN_FOR_WRITE, OUT_OF_MEMORY, INVALID_REQUEST, and APPLIANCE_ERROR. The NOERROR status code indicates a successful write file operation and no error occurred. The FILE_NOT_OPEN_FOR_WRITE status code indicates that the file has not been open for a subsequent write operation. The OUT_OF_MEMORY status code indicates that the appliance was unable to process the request because it was out of memory. The INVALID_REQUEST status code indicates that an invalid request was sent to the appliance. The APPLIANCE_ERROR status code indicates that the appliance was unable to process the request due to an internal error (for example, not enough resources, etc.).

The block number field includes a field ID subfield (1 byte), a field length subfield (2 bytes), and a field data subfield (2 bytes). The field ID subfield includes a predefined value which indicates that this is a block number field. The field length subfield indicates the length of the block number value that follows. This value is preferably sent in network byte order. The field data subfield is a unique block number for tracking blocks of data. This number must match the block number of the Write File Request message corresponding to this Write File Reply message. This value is preferably sent a network work byte order.

A block number field appears in the message if the request was successful (i.e., the status field indicates NOERROR). A block number field should not appear in the message if the write file request message was not successful. The status field field and the block number field may appear in any order in a write file reply message. If any error is returned to the client, the appliance will close the file that was open for writing.

For the Close File After Write command, the Close File After Write Request message is sent from a client to a managed appliance to instruct the appliance to close the file that was previously opened and written from the client to the appliance. This message should be sent after the contents of the file have been written to the appliance.

The record data portion of the Close File After Write Request message contains no fields other than the standard field terminator. The managed appliance simply recognizes that this is a Close File After Write Request message and responds appropriately.

Upon receipt of the Close File After Write Request message, the managed appliance will close the file and generate a Close File After Write Reply message to the client to indicate the status of the Close File After Write Request message.

The record data portion of the Close File After Write Reply message contains a variable length data field which is a status field.

The status field includes a field ID subfield (1 byte), a field length subfield (2 bytes), and a field data subfield (2 bytes). The field ID subfield includes a predefined value indicating that this is a status field. The field length subfield indicates the length of the status data field that follows. Because the field data subfield is 2 bytes in length, the field length value should be 2. The field data subfield is the value indicating the status of the request.

The potential status codes which may appear in the field data subfield include NOERROR, FILE_NOT_OPEN, FILE_ NOT_FOUND, INVALID_REQUEST, and APPLIANCE_ERROR. The NOERROR status code indicates a successful close file after write operation in which no error occurred. The FILE_NOT_OPEN status code indicates that the file has not been opened. The FILE_NOT_FOUND status code indicates that the file does not exist. The INVALID_REQUEST status code indicates that an invalid request was sent to the appliance. The APPLIANCE_ERROR status code indicates that the appliance was unable to process the request due to an internal error (for example, not enough resources, etc.).

For the Open File For Read command, the Open File For Read Request message is sent from a client to a managed appliance to inform the managed appliance that the client wishes to open a file that exists on the appliance and read it. This message should contain the file name that is to be read from the appliance. This message should be sent to the appliance before reading the contents of the file from the appliance. If the appliance replies to this request with an error, the client will not attempt to read the file.

The record data portion of the Open File For Read Request message contains a variable length data field which is the file name field.

The file name field includes a field ID subfield (1 byte), a field length subfield (2 bytes), and a field data subfield (1-12 bytes). The field ID subfield includes a predefined value indicating that this is a file name field. The field length subfield indicates the length of the file name value that follows. This value is preferably sent in network byte order and ranges from 1-12. The field data subfield is a sequence of byte values containing ASCII characters representing a file name. The file name would preferably be in the DOS 8.3 format (for example, CONFIG.EDE).

Upon receipt of the Open File For Read Request message, the managed appliance will generate an Open File For Read Reply message to the client to indicate the status of the request. The record data portion of the Open File For Read Reply message may contain two different types of variable length data fields which are a Status field, and a File Size field.

The Status field contains a field ID subfield (1 byte), a field length subfield (2 bytes), and a field data subfield (2 bytes). The field ID subfield includes a predefined value indicating that this is a status field. The field length subfield indicates the length of the status data field that follows. Because the field data subfield is 2 bytes long, the field length should indicate a value of 2. The field data subfield includes a value indicating the status of the request.

The potential status codes that may appear in the field data subfield include NOERROR, FILE_ALREADY_OPEN_FOR_READ, FILE_NOT_FOUND, INVALID_REQUEST, and APPLIANCE_ERROR. The NOERROR status code indicates a successful open file for read operation in which no error occurred. The FILE_ALREADY_OPEN_FOR_READ status code indicates that the file specified is already open for a read operation. The FILE_NOT_FOUND status code indicates that the file requested does not exist. The INVALID_REQUEST status code indicates that an invalid request was sent to the appliance. The APPLIANCE_ERROR status code indicates that the appliance was unable to process the request due to an internal error (for example, out of memory, not enough resources, etc.).

The File Size field includes a field ID subfield (1 byte), a field length subfield (2 bytes), and a field data subfield (4 bytes). The field ID subfield includes a predefined value indicating that this is a File Size field. The field length subfield indicates the length of the File Size value that follows. Because the field data subfield is 4 bytes long, this value should be 4. The field data subfield indicates the total length of the file to be opened for reading (i.e., the file size). This value is preferably sent in network byte order. The File Size field must appear in the Open File For Read Reply message if the request is successful (i.e., the status field is NOERROR). The File Size field should not appear in the message if the request was not successful. The Status field and the File Size field may appear in any order in an Open File For Read Reply message.

For the Read File command, the Read File Request message is sent from a client to a managed appliance to read a file from the managed appliance. The client will request to read a block of data from the file, one block at a time starting with block one and continuing sequentially. The appliance will reply to this request by returning a block of data from the file. The client will continue to request to read a block of data until there is no more data in the file to be read. When there are no more blocks of data to read from the file in the appliance, the client will issue a Close File After Read command to the appliance to indicate that there is no more data in the file to be read and to close the file. The Read File Request message should not be sent to the appliance until after the client has sent a successful Open File For Read command.

The record data portion of the Read File Request message contains a variable data length field which is identified as a block number field. The block number field includes a field ID (1 byte), a field length subfield (2 bytes), and a field data subfield (2 bytes). The field ID subfield includes a predefined value indicating that this is a block number field. The field length subfield indicates the length of the block number value that follows. The field data subfield includes the unique block number for tracking blocks of data. This value increments for each block of data to be read. This value is preferably sent in network byte order.

Upon receipt of the Read File Request message, the managed appliance will generate a Read File Reply message to the client containing a block of data from the file and indicating the status of the request. If an error is returned from the appliance, the appliance will close the file and the client will not issue any additional Read File Requests.

The record data portion of the Read File Reply message may contain three different types of variable data fields. These variable length data fields are a Status field, a Block Number field, and a Block of Data field.

The Status field includes a field ID subfield (1 byte), a field length subfield (2 bytes), and a field data subfield (2 bytes). The field ID subfield includes a predefined value indicating that this is a status field. The field length subfield indicates the length of the status data field that follows. Because the field data subfield is 2 bytes long, this value should be 2. The field data subfield includes a value indicating a status of the request.

The potential status codes that may be included in the field data subfield are NOERROR, FILE_NOT_OPEN_FOR_

READ, INVALID_REQUEST, and APPLIANCE_ERROR. The NOERROR status code indicates a successful read file operation in which no error occurred. The FILE_NOT_OPEN_FOR_READ status code indicates that the file has not been open for a subsequent read operation. The INVALID_REQUEST status code indicates that an invalid request was sent to the appliance. The APPLIANCE_ERROR status code indicates that the appliance was unable to process the request due to an internal error (for example, out of memory, not enough resources, etc.).

The Block Number field includes a field ID subfield (1 byte), a field length subfield (2 bytes), and a field data subfield (2 bytes). The field ID field includes a predefined value indicating that this is a Block Number field. The field length subfield indicates the length of the Block Number value that follows. The field data subfield indicates the unique Block Number for tracking blocks of data. This number must match the Block Number of the Read File Request message corresponding to this Read File Reply message. The Block Number field must appear in the Read File Reply message if the Read File Request message was successful (i.e., the status field is NOERROR). The Block Number field should not appear in the Read File Reply message if the Read File Request message was not successful.

The Block of Data field includes a field ID subfield (1 byte), a field length subfield (2 bytes), and a field data subfield (1-65,535 bytes). The field ID subfield includes a predefined value indicating that this is a Block of Data field. A field length subfield indicates the total number of bytes in the Block of Data field that follows. The range is 1-65,535. The field data subfield is the block of data from the file. The Block of Data field must appear in the Read File Reply message if the Read File Request was successful (i.e., the status field is NOERROR). The Block of Data field should not appear in the Read File Reply message if the Read File Request was not successful. The Status field, the Block Number field, and the Read File Request field may appear in any order in a Read File Reply message.

For the Close File After Read command, the Close File After Read Request message is sent from a client to a managed appliance to instruct the appliance to close the file that was read from the appliance to the client. This message should be sent after the contents of the file have been read from the appliance.

The only data contained in the record data portion of a Close File After Read request message is the field terminator. There are no variable length data field in the Close File After Read message because the managed appliance recognizes this message based on the command ID type.

Upon receipt of the Close File After Read Request message, the managed appliance will close the file and generate a Close File After Read Reply message to the client to indicate the status of the request.

The record data portion of the Close File After Read Reply message contains a variable length data field called Status field.

The Status field includes a field ID subfield (1 byte), a field length subfield (2 bytes), and a field data subfield (2 bytes). The field ID subfield includes a predefined value indicating that this is a status field. The field length subfield indicates the length of the status data field that follows. The field length value should be set to 2 because the field data subfield is 2 bytes in length. The field data subfield includes a value indicating the status of the request.

The potential status code which may be included in the field data subfield are NOERROR, FILE_NOT_OPEN, FILE_NOT_FOUND, INVALID_REQUEST, and APPLIANCE_ERROR. The NOERROR status code indicates that the close file after read operation was successful and no error occurred. A FILE_NOT_OPEN status code indicates that the file specified has not been previously opened. A FILE_NOT_FOUND status code indicates that the file specified does not exist. The INVALID_REQUEST status code indicates that an invalid request was sent to the appliance. The APPLIANCE_ERROR status code means that the appliance was unable to process the request due to an internal error (for example, not enough resources, etc.).

A Broadcast message is an unsolicited message that is sent from a managed appliance to a client. This message can be sent from a managed appliance at any time. A Broadcast message may be sent, for example, to terminate a connection between a client and a managed appliance.

The record data portion of a Broadcast message may contain two different types of variable length data fields. These two different types are a Broadcast Type field, and a Message field.

A Broadcast Type field includes a field ID subfield (1 byte), a field length subfield (2 bytes), and a field data subfield (2 bytes). The field ID subfield includes a predefined value indicating that this is a Broadcast Type field. The field length subfield is the length of the Broadcast Type field data field that follows. Because the field data subfield is 2 bytes long, this value should be set to 2. The field data subfield includes a value indicating the type of Broadcast message.

In the preferred embodiment, an example of the type of message would be a connection termination message. A connection termination Broadcast message indicates that the managed appliance is about to terminate the secure management protocol session connection between the client and the managed appliance. The managed appliance will terminate the SMP session connection after sending this Broadcast message to the client.

The Message field will contain the reason the connection was terminated. The Message field includes a field ID subfield (1 byte), a field length subfield (2 bytes), and a field data subfield (0-n bytes). The field ID subfield includes a predefined value indicating that this is a Message field. The field length subfield indicates the total number of bytes in the message that follows. The field data subfield is a sequence of byte values containing the characters for the message. The field data subfield is not null terminated. The field data subfield uses the UTF-8 character encoding format. This message can be used by the managed appliance to provide additional information to the client.

Figure 5:
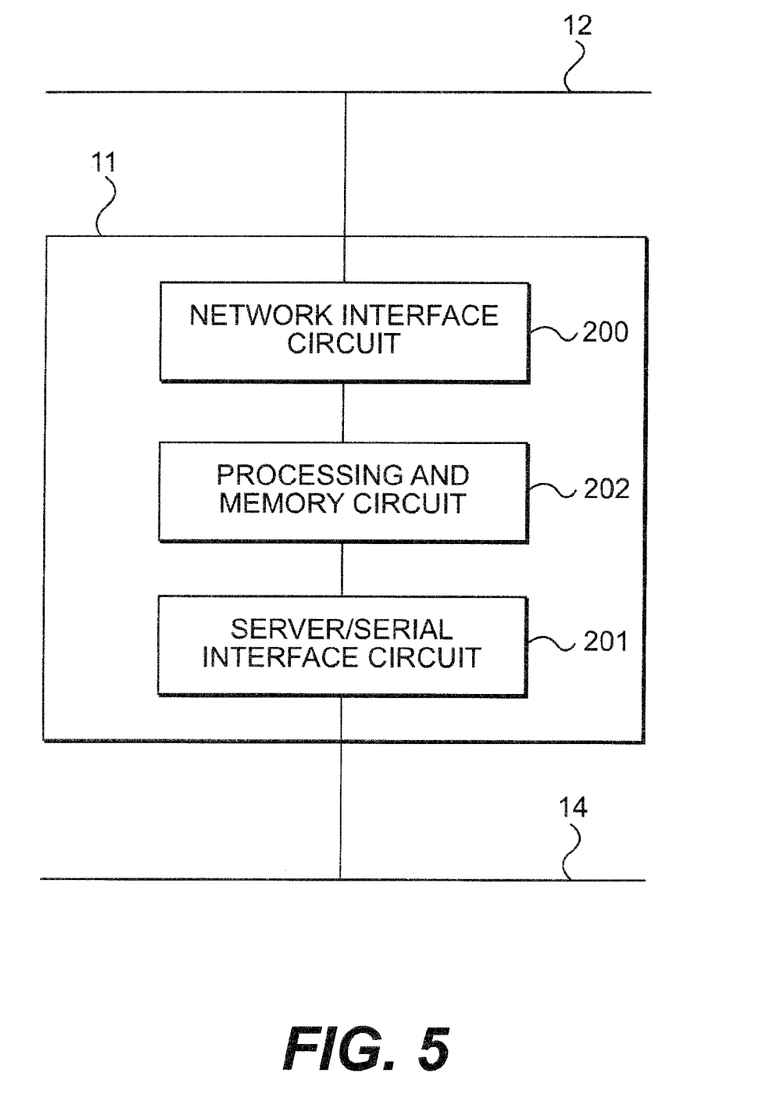
FIG. 5 shows a block diagram of components of a managed appliance according to the present invention.

FIG. 5 shows a block diagram of a managed appliance 11 according to the present invention. In a simple form, the managed appliance 11 includes a network interface circuit 200, a processing and memory circuit 202, and a server/serial interface circuit 201. The network interface circuit 200 communicates with other devices on the network 12. Network interface circuit 200 receives data from other network devices and decodes and/or reformats the received information into a format that can be used by the managed appliance 11. Network interface circuit 200 also formats data received from the processing and memory circuit 202 for transmission through network 12.

Server/serial interface circuit 201 communicates with the devices, such as servers 13 or serial devices, connected to communication link 14. Server/serial interface circuit 201 receives data from the servers 13, serial devices or other devices, and decodes and/or reformats the received information into a format that can be used by the processing and memory circuit 202 of managed appliance 11. Server/serial interface circuit 201 also formats data received from the processing and memory circuit 202 for transmission through communication link 14 to the servers 13, serial devices or other devices.

Processing and memory circuit 202 determines the destination of data received from the network 12 and from the communication link 14. For example, if a workstation 10 sends commands that are destined for a particular server 13, the commands are first received from network 12 by the network interface circuit 200. After reformatting, the commands are sent to the processing and memory circuit 202 where the processing and memory circuit 202 determines which server 13 is to receive the commands. The processing and memory circuit 202 forwards the commands to the server/serial interface circuit 201 with information identifying the particular server 13 that is to receive the commands. Server/serial interface circuit 201 responds to the information from the processing and memory circuit 202 by reformatting the commands into a format suitable for transmission to the particular server 13. The server/serial interface circuit then transmits those commands to the server 13.

A similar operation occurs for data that originates at a particular server 13 or serial device that is destined for a workstation 10. The server or serial data is received, and reformatted by the server/serial interface circuit 201. The processing and memory circuit 202 receives that data and determines which workstation is to receive the data. This determination can be based on a number of factors including whether a particular workstation 10 is currently assigned or otherwise matched to a particular server 13 or serial device; the identity of the server 13 or serial device that generated the data; the content of the data received from the server 13 or serial device, etc. The processing and memory circuit 202 sends the data to the network interface circuit 200 with information identifying the particular workstation 10 which is to receive the server data. The network interface circuit 200 reformats the server data as necessary and sends the data to the workstation through the network 12.

The workstation 10 also transmits SMP commands to the managed appliance 11. In a preferred embodiment, those commands include Login Request message, Logout Request message, SNMP Get Request message, SNMP Get Next Request message, SNMP Set Request message, Open File For Write Request message, Write File Request message, Close File After Write Request message, Open File For Read Request message, Read File Request message, Close File After Read Request message, and Broadcast Request message. Unlike commands that are destined for a server 13 or a serial device, these SMP commands are destined for the managed appliance 11. When an SMP command is received by a managed appliance 11, the network interface circuit 200 decodes and/or reformats the information into a format that can be used by the processing and memory circuit 202.

When the processing and memory circuit 202 receives an SMP command, it generates an appropriate reply message. In a preferred embodiment, the SMP reply messages include Login Reply message, Logout Reply message, SNMP Get Reply message, SNMP Get Next Reply message, SNMP Set Reply message, Open File For Write Reply message, Write File Reply message, Close File After Write Reply message, Open File For Read Reply message, Read File Reply message, and Close File After Read Reply message. The processing and memory circuit 202 forwards the SMP reply messages to the network interface circuit 200 where the messages are reformatted and transmitted through network 12 to workstation 10. The reply messages can be sent to the workstation 10 which sent the request message to the managed appliance 11. Alternatively, the reply messages can be sent to another workstation 10 or other network device if desired.

Modifications and substitutions to the present invention made by one of ordinary skill in the art are considered to be within the scope of the present invention, which is not to be limited except by the claims which follow.

What is claimed is:

1. A system comprising:
   a workstation communicatively coupled to a network; and
   a switch managed appliance communicatively coupled to the network to couple the workstation to a selected one of plural devices connected to the switch managed appliance so the workstation can control processing by the selected one of the plural devices;
   wherein the workstation operatively initiates a management session with the managed appliance by (A) establishing a secure sockets layer connection on a predefined Transmission Control Protocol (TCP) port number with the managed appliance and then issuing a login request to the managed appliance and (B) the switch managed appliance authenticates the workstation based on the login request, and
   wherein the workstation uses the established secure sockets layer connection on the predefined TCP port number and only the established secure sockets layer connection to execute Simple Network Management Protocol (SNMP) commands to the switch managed appliance to control the switch managed appliance using a secure sockets layer communication protocol and the switch managed appliance responds to the SNMP commands only if the switch managed appliance first authenticates the workstation based on the login input identifier.

2. The system of claim 1, wherein the login request is a message that includes a user name and a password corresponding to a workstation user.

3. The system of claim 1, wherein the switch managed appliance responds to the login request by transmitting a login reply across the network.

4. The system of claim 3, wherein the login reply is a message that includes status data reflecting the status of the login request.

5. The system of claim 1, wherein, during the management session, the workstation requests object identifier data from the switch managed appliance.

6. The system of claim 5, wherein the switch managed appliance transmits object identifier data to the workstation.

7. The system of claim 1, wherein, during the management session, the workstation sets the value of an object identifier in the switch managed appliance.

8. The system of claim 1, wherein, during the management session, the workstation writes a file to the switch managed appliance.

9. The system of claim 8, wherein the workstation transmits a request message to the switch managed appliance containing a name of the file and a size of the file.

10. The system of claim 9, wherein the switch managed appliance transmits a reply message to the workstation in response to the request message.

11. The system of claim 1, wherein, during the management session, the workstation reads a file from the switch managed appliance.

12. The system of claim 11, wherein workstation transmits to the switch managed appliance an identification of a name of the file to be read.

13. The system of claim 12, wherein the switch managed appliance transmits blocks of data comprising the file to the workstation, said blocks of data being transmitted one at a time.

14. The system of claim 1, wherein the workstation transmits a broadcast message to the switch managed appliance.

15. The system of claim 1, wherein the switch managed appliance is a KVM (keyboard, video, mouse) switch.

16. The system of claim 1, wherein the switch managed appliance is a serial device switch.

* * * * *